United States Patent [19]

Kramer et al.

[11] 4,091,067

[45] May 23, 1978

[54] PROCESS FOR PRODUCING AN AURAL COMMUNICATIONS RECEIVING DEVICE

[75] Inventors: Harold L. Kramer, Schenectady; Frederick M. Lewis, Burnt Hills, both of N.Y.

[73] Assignee: Marion Health & Safety, Inc., Rockford, Ill.

[21] Appl. No.: 382,513

[22] Filed: Jul. 25, 1973

Related U.S. Application Data

[62] Division of Ser. No. 254,072, May 17, 1972, abandoned.

[51] Int. Cl.$^2$ .......................... B29D 3/02; B29D 31/00

[52] U.S. Cl. .................................... 264/222; 264/250; 264/275; 264/276

[58] Field of Search ............... 264/222, DIG. 30, 271, 264/317, 294, 250, 320, 296, 275; 128/151, 152

[56] References Cited

U.S. PATENT DOCUMENTS

| | | | |
|---|---|---|---|
| 2,691,192 | 10/1954 | Bent | 264/294 |
| 2,910,980 | 11/1959 | Stewart | 128/152 |
| 3,097,059 | 7/1963 | Hoffman | 264/222 |
| 3,440,314 | 4/1969 | Frisch | 264/222 |
| 3,513,269 | 5/1970 | Wilson | 264/222 |
| 3,518,338 | 6/1970 | Tambussi | 264/317 |
| 3,666,852 | 5/1972 | Burke | 264/268 |

*Primary Examiner*—Robert F. White

*Attorney, Agent, or Firm*—Leydig, Voit, Osann, Mayer & Holt, Ltd.

[57] ABSTRACT

A process for making an aural communications receiving device of formed-in-place elastomeric composition constructed especially to provide a smooth, tight seal over the mouth of the ear canal when stretched and including a formed-in-place sound transmitting passageway acoustically coupled to an integral connecting means for securing a communications component or to an embedded speaker at an outwardly presented surface.

2 Claims, 15 Drawing Figures

PROCESS FOR PRODUCING AN AURAL COMMUNICATIONS RECEIVING DEVICE

This is a division, of application Ser. No. 254,072, filed May 17, 1972, now abandoned.

This invention relates, in general, to a process for making aural communications receiving devices. It relates, more specifically, to an improved process for making formed-in-place communications receiving devices of novel configuration and of advantageous construction. Because the devices are molded to the ear and permanently retain their shape, they are positive fitting and comfortable. The devices can be reused indefinitely in combination with hearing aids, stethoscopes, ear pieces for dictating and transcribing devices, stereo headsets, radio-communications receivers, and the like.

BACKGROUND OF THE INVENTION

The portions of aural receiving devices of the prior art which fit in the wearer's ear are generally formed in one of several well known configurations. They may be pre-molded from either a moldable elastomeric material such as rubber or a synthetic polymer. Their purpose is primarily to retain the sound transmitting conduit in the ear and secondarily to screen out extraneous sound or noise. Among the devices formed in accordance with the prior art practice there are the well known simple, pre-molded channelled ear pieces commonly seen on stethoscopes and stenographic transcribers. No attempt is usually made to fit these to the individual and sound transfer into the receiver is usually less than satisfactory because of sound leaks around the outside surface of the pieces. They are normally uncomfortable if worn for long periods of time. Somewhat more sophisticated pre-formed devices are available from suppliers of hearing aids to handicapped individuals, and the like, and better results in terms of pure sound transmission are obtained because usually measurements are made of the ear before selecting the proper size of hearing receiver.

So far, the best permanent communications receiving devices for fitting all sizes and types of ears are made by custom-molding them to conform to the subject. This is commonly done with hearing aid receivers, for example. Another such custom-molded device is a valved, channelled hearing protector described in Wesemann, U.S. Pat. No. 3,603,309, for people like hunters who need noise protection when firing their guns, but wish also to be able to converse without the need to remove the protector, and do this by opening an internal ball valve on the channel. Such custom-molded pieces provide a positive fit and are more comfortable to the subject. It is the practice to prepare an impression of the subject's ear, make a mold and then cast a device in the mold which, when inserted in the subject's ear, will conform to the shape thereof. The sound transmitting passageways are drilled rather than formed-in-place. Much labor and at least one visit to check the fit can be eliminated if such custom-molded devices are formed-in-place, that is to say, cast in the ear and hardened.

SUMMARY OF THE INVENTION

The general aim of the present invention is to provide a novel and comparatively simple process for making a formed-in-place communications receiver having a uniquely formed sound transmitting passageway. In large, this aim is achieved by molding a curable putty-like composition around a small diameter coring form and then pressing the composition into the ear to form a body which conforms to the ear. An apertured component then is embedded in the outer surface of the body and, after the composition has cured, the coring form is removed to leave a sound transmitting passageway extending through the receiver and between the apertured component and the ear canal.

The invention also resides in the unique use of a finishing plate to form a flat surface on the outer side of the body and in the novel coaction between the finishing plate, the apertured component and the coring form.

These and other objects and advantages of the present invention will be readily apparent from the following detailed description of several embodiments thereof and the accompanying drawings.

DESCRIPTION OF THE DRAWINGS

In the drawings:

FIG. 2, showing a curable elastomeric composition and a coring form; FIG. 3, the form being encased by the composition; FIG. 4, showing the composition in a blunt cone prior to insertion; FIG. 5 showing the cone inserted into the ear canal and mounded; FIG. 6 showing the composition molded into folds of the ear to provide means to assist in retention; and FIG. 7 showing a finish plate pushed against the composition confronting an embedded adapter ring and providing a molded finished outwardly presented surface.

DESCRIPTION OF THE PREFERRED EMBODIMENTS

Figure 1:
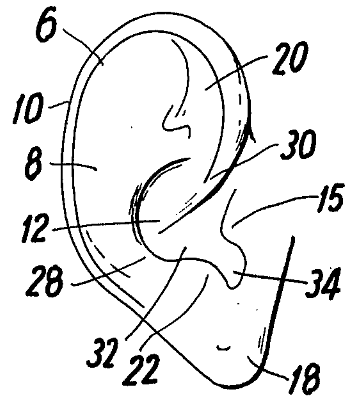
FIG. 1 illustrates the auricle, i.e., the lateral surface of the external ear, showing the numerous eminences and depressions thereof.
Figure 11:
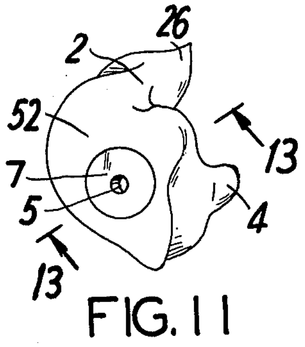
FIGS. 11 and 12 show one preferred embodiment of this invention, front and back perspective views, respectively, which has a protuberance matching the size of the ear canal in its stretched position, the outer portion of which covers only a minimal area of the auricle.
Figure 12:
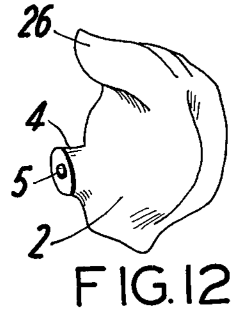

Having reference to the drawings, FIGS. 11 and 12 illustrate a preferred form, front and back, of one improved sound receiving device embodying the invention. This form of the device comprises a body and integral sound transmission passageway and a connecting or adapter ring, the body having a single structural member formed to fit the configuration of a portion of the auricle (although the entire auricle may be covered, when desired) and the mouth of the ear canal when the canal opening is stretched. In general, the shape consists of an outer part 2 which fits into the auricle (6, FIG. 1), i.e., the projecting portion of the external ear, a protuberance 4 which fits into the mouth of ear canal 16 (FIGS. 8 and 9) when the ear canal is stretched, a sound transmitting passageway 5 and an apertured component in the form of a connecting or adapter ring 7 (FIG. 11). In this embodiment, the size and shape of outer part 2 is determined by the size and shape of the corresponding parts of the ear because the device is molded-in-place. So too, the shape of protuberance 4 will conform to the shape of the ear canal, when stretched, and the length will be at least such that the area supported by tough cartilage 14 at the entrance to the ear canal is sealed when the receiver is inserted therein. In general, length of protuberance 4 may be varied so long as the required tight seal is provided — in most subjects from about ¼ to about 9/16 in. is satisfactory. It is preferred, however, that the protuberance not extend far into the canal, because the skin, next to the temporal bone and unsupported by cartilage, is more tender and comfort is impaired.

Figure 14:
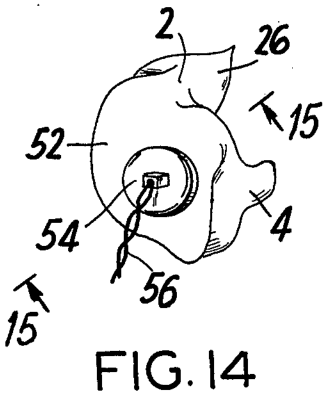
FIG. 14 shows another preferred embodiment of this invention, front perspective view, having a miniature speaker embedded therein.
Figure 15:
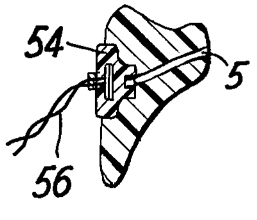
FIG. 15 is a cross-section of the device of FIG. 14, along line 15—15, showing the acoustical coupling between the speaker and the sound-transmitting passageway.

Another preferred form of the sound receiving devices according to this invention is shown in FIGS. 14 and 15. These bodies have the same structural features as described for those of FIGS. 11 and 12 except that an apertured component in the form of a miniature speaker 54 rather than a connector or adapter is embedded at outer surface 52 and is acoustically coupled with sound-transmitting passageway 5. Typical miniature speakers will be about ½ inch in diameter and about 3/16 inch deep, i.e., about the size of an aspirin tablet and conventionally will include wires 56 or other energy-carrying conduits.

Broadly, the devices can include outer portion 2, large enough to completely fill auricle 6 (FIG. 1) of the ear. The auricle, i.e., the projecting portion of the external ear, seen clearly in FIG. 1, comprises the helix 10, antihelix 8, fossa of the antihelix 20, antitragus 22, tragus 15, lobe 18 and concha 12. Concha 12 is partially divided into two parts by crus 28 or commencement of the helix, the upper part termed cymba conchae 30 and the lower part cavum conchae 32. Between tragus 15 and antitragus 22 is the intertragic notch 34.

However, in the most preferred embodiment of the invention the outer portion 2 is of specifically different configuration, but possesses certain structural elements in common with devices covering the entire auricle and provides the same advantages. It has surprisingly been found unnecessary to completely cover the entire auricle of the ear. It is disclosed in U.S. Pat. No. 2,910,980, for example, that if the protector covers less area than the antihelix, the fossa of the antihelix, the tragus, the antitragus and the concha as well as the mouth of the ear canal, there will be a corresponding decrease in extraneous sound exclusion. In fact, however, if protuberance 4 is shaped to fit the stretched ear canal, a substantial decrease in the size of outer portion 2 is possible without a corresponding decrease in sound attenuation. The bulk and weight of such an embodiment is less and comfort is correspondingly increased. The preferred embodiment of FIGS. 11 and 12 covers an area coextensive with and no greater than that of the concha, 12, the tragus, 15, the antitragis, 22, and the upper forward portion of the antihelix 8 (represented in FIGS. 11, 12 and 14 by portion 26) as well as that portion of the mouth of ear canal 16 which is supported by cartilage 14 when stretched, as shown in FIGS. 8 and 9.

Figure 8:
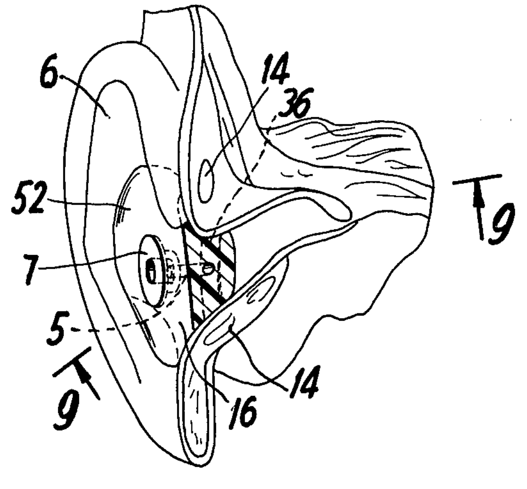
FIG. 8 is an elevation, partially in section, of a human ear, illustrating the ear canal in the stretched configuration and showing a hand-molded communications receiving device according to this invention extending into the canal.
Figure 9:
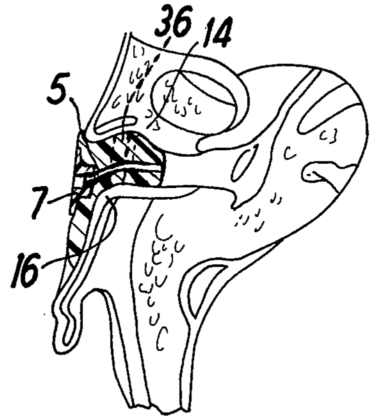
FIG. 9 is a horizontal section through the ear and canal of FIG. 8 along line 9—9; upper half of section.

It is a feature of the communications receivers of this invention to provide a tightly fitting obstruction at the external orifice of the stretched ear canal (dashed area 36, FIGS. 8 and 9). This prohibits the passage of any sound other than that from passageway 5 into the ear canal. It is seen in FIGS. 8 and 9 that to effect this seal, communications receivers according to this invention follow the walls of the concha and extend into the ear canal slightly beyond the cartilage regions of the tragus and eminentia conchae. However, they do not extend so far into the ear canal as to cause pressure on the temporal bone, even during its movement, e.g., during chewing.

In the embodiments shown in FIGS. 8, 11 and 14, the outer surface of the communications receivers is finished as essentially a flat plane existing entirely within the concha cavity and intertragic notch. The elastomeric material partly fills the concha in the cymba conchae, cavum conchae and intertragic notch areas. It is preferred to use only a sufficient amount of elastomeric composition to give strength and rigidity to the final product. This results in about a ¼ to ⅜ inch depth of elastomer over the crus section of the helix.

While the seal area on the communications receiver according to this invention has a tight fit in the stretched ear canal, this is not sufficient by itself to hold the seal during excessive movement of the face, jaws and ear. As mentioned above, it is intended that the device include means for assisting in the retention of the device in the ear. A preferred such means is a second surface shaped to be held in the fixed position at least by the fossa triangularis and crus section of the helix; the tragus; antitragus; concha; and the cartilaginous part of the stretched external acoustic meatus (ear canal).

It is believed that improved exclusion of extraneous sound is achieved with the novel configurations of this invention due to the following factors:

(a) the external acoustic meatus is soft and flesh-like in rheology, and a resiliently flexible body complements such a surface;

(b) the loose fitting ear pieces of the prior art vibrate in the ear canal because they "float" on a support of soft flesh. The movement of such devices, due to external sound waves, will regenerate new sound waves inside the canal, which may move out and then feed back, causing squeeling; but these are precluded by the present device; and (c) when a tight fit is provided in the ear canal with the present configurations, the flesh is compressed so that the sound receiver is not as free to move as it is when suspended on soft flesh.

Figure 13:
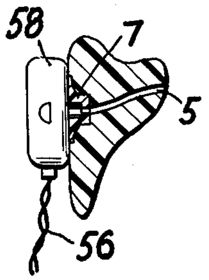
FIG. 13 is a cross-section of the device of FIG. 11 along line 13—13 showing a communications device (speaker) inserted in the adapter ring.

Also shown in the embodiment of FIGS. 8, 9 and 11, is connecting and adapting ring 7. This can be of any convenient design and construction to aid in grasping the external sound transmitting conduit. One such means comprises a brass snap ring adapter (not shown). Another, preferred configuration is shown and functions by elastically gripping the external communicator (shown as 58 in FIG. 13). This can comprise a relatively soft and flexible ring which is pre-molded and embedded in the main elastomer during the cure process. In any case, the centrally dispersed aperture in the connecting ring will be aligned with the open passageway in the device. If the elastomeric body is comprised of a molded silicone rubber, it is especially preferred to use a pre-molded silicone rubber connecting ring because this will chemically bond to the receiving device during curing and no adhesive is required for retaining the ring.

As is shown in FIGS. 8, 11 and 15, it is preferred that the surface of either the connecting ring or the speaker lie in a plane slightly outside of the outer surface of the device. This avoids presentation of a rolled edge at the interface between the ring or speaker and the cured elastomeric body. The desired spacing is easily provided by use of a properly designed finishing plate as will be described hereinafter.

As previously indicated, the material desirably utilized for formation of the communications receiving devices of this invention is a synthetic polymer. Specifically, a silicone polymer (organopolysiloxane) has been found particularly suitable for this application. An important reason for the selection of this specific material is the lack of irritation, ease of cleaning, stability towards secretions and a wide variety of environmental conditions. The silicone polymers can be formulated to have the desired elastomeric characteristics for this application. It is only necessary that the devices have adequate structural rigidity to assure retention within the ear coupled with flexible, elastomeric properties which allow the device to follow the ear canal during movement and thereby insure a tight seal.

It is preferred to utilize silicone rubber formulations that vulcanize or cure at or near room temperature. Such formulations are well known and are described, for example, in U.S. Pat. Nos. 2,843,555 and 3,127,363 (especially Examples 19–21), the disclosure of which are incorporated herein by reference.

Especially preferred formulations comprise curable organopolysiloxanes of the above general room temperature vulcanizing type which have been formulated to a stiff, putty-like consistency so that they can be catalyzed and molded in place without tilting the head, or using cotton blocks, and with the other advantages noted above for such rheology. In addition, tighter fits at the critical stretched ear canal area are more easily obtained with such formulations than can be achieved with curable silicone resins in soft or liquid-like states. Such formulations are disclosed in U.S. Pat. No. 3,696,090, the disclosure of which is incorporated herein by reference.

A suitable putty-like composition consists of:

(a) a linear, high molecular weight fluid organopolysiloxane containing terminal silicon bonded hydroxy groups and having a viscosity of $3 \times 10^6$ to $2 \times 10^8$ centipoise when measured at 25° C., the organic group of the organopolysiloxane representing monovalent hydrocarbon radicals;

(b) 0–100% by weight of said high molecular weight organosiloxane of a low molecular weight fluid organopolysiloxane containing terminal silicon bonded hydroxy groups and having a viscosity within the range of 100 to $3.0 \times 10^5$ centipoise at 25° C. wherein the organic groups of the low molecular weight organopolysiloxane represent monovalent hydrocarbon radicals;

(c) a filler;

(d) an alkyl silicate selected from the class consisting of (1) a monomeric organosilicate corresponding to the general formula

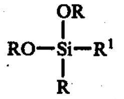

where R is a radical selected from the class consisting of alkyl, haloalkyl, aryl, haloaryl, aralkyl, alkenyl, cycloalkyl, cycloalkenyl, and cyanoalkyl radicals and $R^1$ is selected from the class consisting of alkyl, haloalkyl, aryl, haloaryl, alkenyl, cycloalkyl, cycloalkenyl, cyanoalkyl, alkoxy and aryloxy radicals or (2) a liquid partial hydrolysis product of the aforementioned organosilicate monomeric compounds and (e) a metallic salt of an organic monocarboxylic or dicarboxylic acid in which the metal ion is selected from the class consisting of lead, tin, zirconium, antimony, iron, cadmium, barium, calcium, titanium, bismuth and manganese.

The present invention provides a process to produce formed-in-place communications receivers using a stiff, putty-like curable elastomer.

In comparison with previous formulations, a stiff formulation gives better protection against the introduction of extraneous sound because during the molding process, the ear canal is pulled to stretch it larger. Then the "stiff" putty is inserted and packed to obtain a tight fit. The ear is then released; but the stiff putty retains pressure against the cartilage area at the entrance of the ear canal, where the seal is desired, while the elastomer is curing. Because the "stiff" consistency allows the tight fit to be maintained during the cure process, the ear can be released with no further attention.

Figure 3:
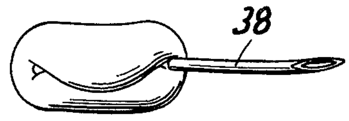
FIGS. 2–7 are perspective views illustrating sequentially the major steps contemplated by the present invention to form a communications receiver device in the human ear.
Figure 2:
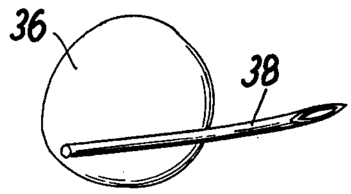
Figure 5:
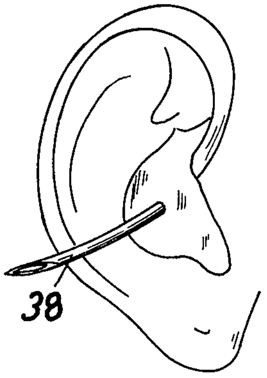
Figure 4:
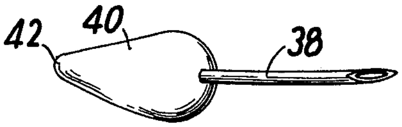
Figure 6:
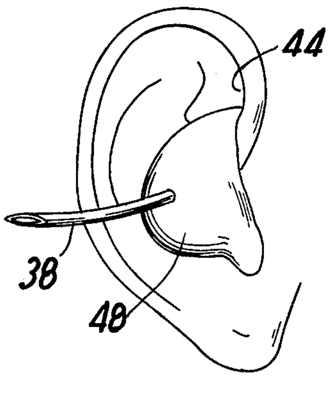
Figure 7:
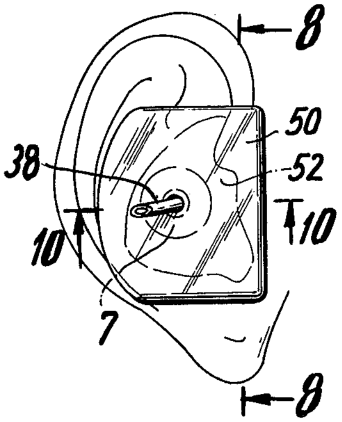

To fit subjects with mold-in-place communications receiving devices according to this invention, the following preliminary steps are taken:

(i) the outer ear is cleaned, if necessary, with a cotton swab lightly dipped in mineral oil;

(ii) the curable putty-like elastomeric composition is catalyzed and is kneaded until well mixed. Before the putty cures to a permanent shape, the steps illustrated in FIGS. 2–7 and outlined as follows are carried out:

Referring to FIG. 2, a portion of the mixed putty-like composition is formed between the fingers into a disc 36 about 1½ inches in diameter and about ⅛ inch thick. Coring form 38 which can be, for example, a hollow tube of plastic or other suitable material which is easily releasible from the cured elastomer and which has an outside diameter corresponding to the inside diameter of the sound transmitting passageway in the finished receiver is placed on the round end of disc 36. A suitable coring form can be tubing sold under the trade mark TYGON by the Norton Company, Tallmadge, Ohio. This is releasible easily from the cured composition. Referring to FIG. 3, the putty disc is rolled around coring tube 38 (which preferably is rounded on the inner end and sealed) then, as is seen in FIG. 4, the roll is formed into a plug such as a blunt, tapered cone 40. Cone 40 is shaped so that apex 42 will enter only slightly beyond the ear canal opening. It is important to leave the outer end of coring form 38 exposed. If the inner end is not exposed at apex 42 — in final finishing, the composition is cut back from the apex to expose the form. Referring to FIG. 5, the outer extremity of the ear canal (not shown) is stretched and enlarged, for example, by gently grasping the portion of the ear designated by the arrow, between the thumb and forefinger, and pulling the ear back, up, and out while simultaneously inserting the apex of cone 40 into the canal opening. If the tapered end of the cone does not go through the canal opening unhampered, the putty is removed, reshaped to a more sharply tapered cone and reinserted. If the cone goes into the stretched canal beyond the first bend, the cone is removed, made more bluntly tapered and reinserted. This is critical — while still holding the ear back, a tight seal is made at the stretched and enlarged canal opening by firmly packing the putty around the canal opening — especially the forward side of the ear canal opening. Then, if necessary, the coring form is adjusted to center in the ear canal area. Care is taken also to avoid pushing the putty too deeply down the canal, i.e., more than slightly beyond the cartilage regions of the tragus and eminentia conchae. Referring to FIG. 6, the external portion is made by adding additional putty and working it snugly into the outer ear. This is done most readily by inserting one end of the putty into the space behind the front fold portion 44 of the ear, folding the remaining putty down filling portion 46 of the ear shell and continuing to mold and mound the putty around the coring form in the area designated 48. Next coring tube 38 is repositioned, if necessary, to be approximately centered in the shell of the ear. This results in a outer portion with a mounded mass at least sufficient to moldably engage with the folds of the outer ear and provide means for assisting in the retention of the device in the ear. Referring to FIG. 7, connector or adapter ring 7 is installed and an outwardly presented first surface is provided by engaging the exposed, preferably tapered, end of coring from 38 with an aperture in a combination comprising adapter ring 7 and finishing plate 50. If miniature speaker 54 is used, coring form 38 is inserted into an aperture in the speaker. Care is taken to insure that the ring or speaker confronts the putty and that their surfaces remain clean for adhesion purposes. Insertion is facilitated by sliding the combination into the putty with a slight twisting motion and a straight in push, with enough force to seat the ring or speaker and plate so that the ring or speaker is completely embedded into the putty and the inner surface of the finishing plate is caused to press the composition into a first surface 52 at the area of contact therewith. The finishing plate is positioned finally so that it nearly contacts the ear shell. The subject must not chew or do any unnecessary talking from this point until the composition cures to a permanent shape — because jaw movement can distort the uncured mold.

It should be noted that if finishing plate 50 is provided with a slight recess (FIG. 10) into which the outer surface of ring 7 or speaker 54 fits, after cure and removal, the surface of the ring will desirably be slightly above the finished first surface of the device. Of course, for the embedded speaker embodiments, the plate will be suitably modified to accommodate the outwardly presented surface of the speaker.

If resin-coating is contemplated, after the device has cured; it is removed from ear and only the finish place is removed. The coring tube is not removed until after the resin-coating is completed.

The trimming and resin-coating steps can be carried out as follows: After the shape is permanent, the skin is gently pulled away from the device, then the top is worked out of front fold 44 of the ear. The lower back portion of the ear is pressed and with a slight outward tug and forward rotation of the finishing plate and mold, the device is removed. The finishing plate, which is made of a material which does not adhere to the cured putty, e.g., an acrylic or styrene thermoplastic resin, preferably transparent, is removed by gripping the receiver device with one hand and applying a steady firm twist with the other. This causes the surfaces to part, then with a gentle twisting motion, and a straight out pull, the finishing plate is separated. After trimming any edges, and trimming back the protuberance to expose the coring form, the device is optionally dipped in a suitable finish coating, allowed to drain, and finally the coring form is removed, by applying a steady firm pull.

Ordinarily it is preferred to have the composition moldable to shape of the ear within about 3 to 6 minutes after mixing. Cure to a permanent shape can take place during the next 10 to 15 minutes or so, during which the subject is free to return to his duties. These times are merely illustrative and not critical, and are variable with the particular formulation employed and such can be adjusted by those skilled in the art to meet any desired needs.

The finished communications receivers can be reinserted by pulling down on the ear lobe or up on the top part of the ear, to stretch the ear canal so that the device will go in easily. Using a twisting motion (so the top of the device is going toward the front of the head) the receiver is pushed into the ear. It is important that a good seal is obtained and the device is tucked into the upper forward portion of the helix.

It is convenient to provide the silicone composition in a flexible mixing bag containing catalyst in a rupturable pouch. The composition is prepared by squeezing the bag to rupture the pouch of catalyst and kneading to mix it into the polyorganosiloxane. When well mixed, the bag can be cut open and fitting begun.

Preferred resinous coatings comprise catalyzed organopolysiloxane composition which are applied by dipping and allowing the composition to cure. Such compositions can be made by those skilled in the art and are disclosed, for example, U.S. Pat. No. 3,701,753, the disclosure of which is incorporated herein by reference.

Figure 10:
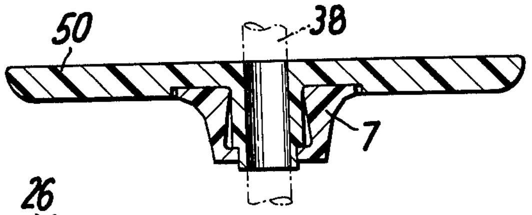
FIG. 10 is a cross-section of a finishing plate and adapter ring combination used in making one type of communications receiver of this invention taken on line 10—10 in FIG. 7.

The connecting ring preferred for use in this invention is shown in FIG. 10. If the ring is molded from high durometer (e.g., Shore A80) silicone rubber, this design and material will provide the following advantages with a silicone putty body: high adhesion is attained through a similarity of materials (although those skilled in the art will recognize that careful packaging and handling will be necessary to prevent contamination which might greatly reduce bond strength). The design will permit insertion into the uncured silicone putty without exhibiting a rolled edge between the ring and the silicone rubber; it will provide a relatively ample bonding surface to assure good adhesion, and the material will provide suitable friction working against the hearing receiver stub to reduce the rotation motion.

The finishing plate preferred for use in this invention is shown in FIGS. 7 and 10. It has been designed to be compatible with the preferred connecting ring, and is transparent. Such a plate is advantageous in providing a smooth finish surface on the receiving device, locating the insert ring around the coring form and parallel to the finish surface; locating the insert ring so that it projects slightly above the finish surface; establishing the proper angle between the finish surface and the ear; refraining from sticking to the uncured silicone rubber; permitting use on either the left or the right ear; and preventing uncured silicone rubber from being forced up into the aperture in the insert ring.

The principles of this invention have been explained and have been illustrated and described in what are now considered to represent the best embodiments. It is to be understood that, within the scope of the appended claims, the invention may be practiced otherwise than as specifically illustrated and described.

We claim:

1. A process for producing a formed-in-place communications receiver for the human ear, said process comprising the steps of:

(a) wrapping longitudinally around a small diameter coring form a disc of a composition which comprises a non-irritating curable synthetic elastomer having a stiff putty-like consistency, molding said composition on said coring form and into the shape of a blunt tapered cone, the coring form extending inwardly from the base of the cone to a point adjacent the apex of the cone, leaving at least the outer end of the coring form exposed, the coring form having an outside diameter sized to correspond to the diameter of a small sound transmitting passageway in said receiver and comprising a material which is easily releasable from the cured elastomer;

(b) inserting the apex of the tapered cone into the outer opening of the ear canal to a depth slightly beyond the cartilage regions of the tragus and the eminentia conchae, firmly packing the composition around the ear canal opening to produce a receiver body having a protuberance which extends into and conforms to the outer opening of the ear canal, and leaving a part of the receiver body outside of the ear canal opening and the coring form centrally located within the receiver body and the ear canal;

(c) molding the external portion of the receiver body into an ear shell conforming surface and adding an additional amount of said composition to provide a mass at least sufficient to moldably engage with the outer ear and provide means for assisting in the retention of the receiver in the ear;

(d) engaging the outer, exposed end of said coring form with an aperture in a combination comprising (1) a finishing plate and (2) an apertured communications component or an apertured means for connecting a communications component to said receiver body, pushing said combination down the coring form and into engagement with the receiver body using sufficient force to embed the communications component or connecting means into the composition and to cause the inner surface of the finishing plate to press the composition into a substantially flat surface at the area of contact with the plate, said communications component or connecting means comprising a material which is bondable to the elastomer, and said finishing plate comprising a material which is easily releasable from the elastomer;

(e) allowing the elastomer to cure to a permanent shape; and (f) removing the finishing plate and the coring form from the communications receiver so produced.

2. A process as defined in claim 1 in which said connecting means is an adapter ring and in which said communications component is a minature speaker, said ring or said speaker being embedded into the composition to a depth which leaves the outer exposed surface of said ring or said speaker in a plane slightly outside of said flat surface.

* * * * *